United States Patent [19]

Feuersanger et al.

[11] Patent Number: 4,584,454
[45] Date of Patent: Apr. 22, 1986

[54] METHOD OF WELDING A LAMP FEEDTHROUGH ASSEMBLY; AND APPARATUS THEREFOR

[75] Inventors: Alfred E. Feuersanger, Framingham; James P. Drummey, Jr., Norwood, both of Mass.

[73] Assignee: GTE Laboratories Incorporated, Waltham, Mass.

[21] Appl. No.: 604,562

[22] Filed: Apr. 27, 1984

[51] Int. Cl.4 .............................................. B23K 11/32
[52] U.S. Cl. ................................ 219/118; 219/117.1; 219/78.01; 445/26; 445/29
[58] Field of Search ............... 219/78.01, 78.02, 117.1, 219/118, 119, 148, 162, 9.5, 10.41; 445/26, 29

[56] References Cited

U.S. PATENT DOCUMENTS

| 2,265,561 | 12/1941 | Hoern | 219/93 X |
| 3,992,602 | 11/1976 | Ashton | 219/118 X |
| 4,334,628 | 6/1982 | Buhrer et al. | 220/2.1 R |

*Primary Examiner*—Clarence L. Albritton
*Assistant Examiner*—C. M. Sigda
*Attorney, Agent, or Firm*—Joseph S. Romanow

[57] ABSTRACT

This invention provides a method of electric current welding in a flowing inert gas atmosphere of an electric feedthrough assembly for an electric lamp, and an apparatus for performing such welds. The method and apparatus are well suited to welding refractory metals, e.g., a molybdenum-titanium-nickel alloy feedthrough body a tungsten electrode for use in an alumina arc tube of a high-pressure sodium lamp, and a molybdenum lead-in wire pin. When the tungsten electrode is inserted into a receiving cavity in the feedthrough body and appropriate pressure applied, the electrical resistance of the solid-to-solid rough interface is greater than that of either the electrode pin or feedthrough so that application of an appropriate electrical pulse causes melting to occur only in the immediate vicinity of the interface whereby extensive recrystallization of the feedthrough body does not occur. A welding electrode in the form of a plate having a thickness approximately equal to the insertion depth of the lamp electrode into the feedthrough body has a cylindrical hole into which the feedthrough body is mounted so that the electrical current applied during the welding process flows primarily radially through the feedthrough body whereby the feedthrough body is further protected against extensive heating during the welding process. Provision of welding electrodes of substantial mass and high thermal conductivity draws heat from the feedthrough during and after the weld so that the feedthrough body is further protected from extensive heating.

9 Claims, 7 Drawing Figures

METHOD OF WELDING A LAMP FEEDTHROUGH ASSEMBLY; AND APPARATUS THEREFOR

CROSS REFERENCES TO RELATED APPLICATIONS

Copending U.S. application, entitled *Mo-Ti Members with Non-metallic Sintering Aids*, by Ditchek et al, filed Jan. 9, 1984, having Ser. No. 568,995, now U.S. Pat. No. 4,537,323, contains related subject matter. Copending U.S. application, entitled *Method of Welding a Lamp Feedthrough Assembly; and Apparatus Therefor*, by Middleton, filed concurrently herewith, now U.S. Pat. No. 4,542,843, contains related subject matter.

TECHNICAL FIELD This invention relates to the field of electric lamp components and more particularly to welding methods and equipment for the fabrication of electric feedthrough assemblies for such lamps.

BACKGROUND OF THE INVENTION

In U.S. Pat. No. 4,334,628, by Buhrer et al, and U S. Pat. No. 4,366,410, by Buhrer, both patents being incorporated herein by reference, there is disclosed a vacuum-tight assembly, such as a discharge tube for a metal vapor discharge lamp. The vacuum-tight assembly comprises a high-density polycrystalline ceramic body, such as alumina or yttria, having a cavity, at least one closure member, and a sealing material for hermetically sealing the cavity. The material for the closure member and sealing material have thermal coefficients of expansion closely matched to the thermal coefficient of expansion of the ceramic body over a wide temperature range thereby facilitating fabrication of the vacuum-tight assembly by sintering. Certain metals and alloys are well suited for the closure member, e.g., molybdenum, or mixtures thereof. These refractory metals are especially difficult to weld. The closure member will hereinafter be referred to as an electric feedthrough assembly or simply as a feedthrough.

Various methods of fabricating electric feedthrough assemblies are known. The Buhrer et al patent teaches bonding of the electrode pin and the lead-in pin into holes in opposite sides of the body of the feedthrough by means of sintering or certain welding techniques which are not suitable for presently preferred refractory metals. The Buhrer patent teaches welding in an inert gas by an electric arc or laser welding.

In production, separate attachment of the tungsten electrode to the feedthrough is preferred over sintering in of the electrode pin. Separate attachment allows a smaller part inventory for a particular feedthrough size. Separate attachment also permits easy adjustment of the desired backspacing for specific lamps.

In the existing art, separate attachment of the tungsten electrode to a niobium metal feedthrough is accomplished by tungsten-inert-gas (TIG) welding producing a brittle tungsten-niobium alloy. With the high temperatures experienced during TIG welding, extensive regions of the feedthrough are heated to the molten state and recrystallized during cooling. This also occurs in TIG welding of molybdenum metal feedthroughs. Extensive recrystallization produces larger grain size which often results in a brittle weld. Also, the recrystallized feedthrough body is prone to crack due to internal forces caused by temperature extremes experienced during lamp warm up, operation, and cool down. Where a titanium and molybdenum alloy is involved, oxidation is a persistent problem despite the inert gas environment; it is believed that oxygen may be released from the materials themselves which reacts with the alloy resulting in a weak mechanical connection with high electrical resistance. If the coil is attached to the electrode, an electron-emissive coating on the coil may be damaged by the welding process.

With laser welding carried out on molybdenum-titanium-nickel alloys, the joint to be welded is rotated under the beam of a pulsed YAG laser at 1.06 micrometers whereby considerable energy (and therefore heat) is absorbed by the joint. As a result, the same problems are experienced with laser welding as are experienced with TIG welding. Another disadvantage of laser welding is the high cost of the welding equipment.

While TIG and laser welding for niobium metal is being successfully employed in the lamp-making field today, it would be an advancement of the art if a novel welding technique were provided which avoids the difficulties and problems discussed above particularly if the new technique is economically feasible for manufacturing processes.

DISCLOSURE OF THE INVENTION

It is, therefore, an object of the invention to obviate the deficiencies in the prior art.

It is another object of the invention to provide a method of welding electric feedthrough assemblies for electric lamps wherein the feedthrough assemblies comprise electrically conductive refractory materials.

A further object of the invention is to provide an apparatus suitable for welding electric feedthrough assemblies for electric lamps wherein the feedthrough assemblies comprise electrically conductive refractory materials.

Still another object of the invention is to provide a method and apparatus for use therewith for welding refractory metals.

A further object of the invention is to provide method of fabricating electric feedthrough assemblies for electric lamps which is easier and less costly to implement in a production environment than that of the existing art.

Another object of the invention is to provide a clean environment for the electrode coil coated with an electron emissive material.

These objects are accomplished, in one aspect of the invention, by provision of a method of welding an electric feedthrough assembly for an electric lamp. The feedthrough assembly comprises a plug and a wire pin where the plug and wire pin each are formed from an electrically conductive refractory material. The plug has a body with a cavity formed therein for receiving the wire pin. The wire pin has first and second ends. The welding method comprises the following steps: inserting the first end of the wire pin into the cavity so that a joint is formed; surrounding the joint with a flowing inert gas atmosphere; applying force such that the wire pin makes intimate contact with the surface of the plug within the cavity; and applying a pulse of electrical current through the wire pin and plug such that a permanent bond is formed between the wire pin and the surface of the plug within the cavity.

The above disclosed method of welding may be accomplished by employing an apparatus comprising an outer wall partially enclosing a gas chamber. Means are provided for mounting the plug such that the cavity is exposed to the gas chamber. A first electrode forms a wall of the gas chamber; this electrode makes contact with the plug. A second electrode protrudes into the gas chamber; this electrode makes contact with the wire pin. Means are provided for substantially closing the gas chamber. Means are provided for purging the gas chamber of the ambient atmosphere, and means are provided for filling the gas chamber with a flowing inert gas atmosphere. Means are provided for applying force such that intimate contact between the wire pin and the surface of the plug within the cavity is attained. Means are provided for applying an electrical pulse through the first and second electrodes, the wire pin, and the plug such that a permanent bond is formed between the wire pin and the surface of the plug within the cavity.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawings.

Figure 1:
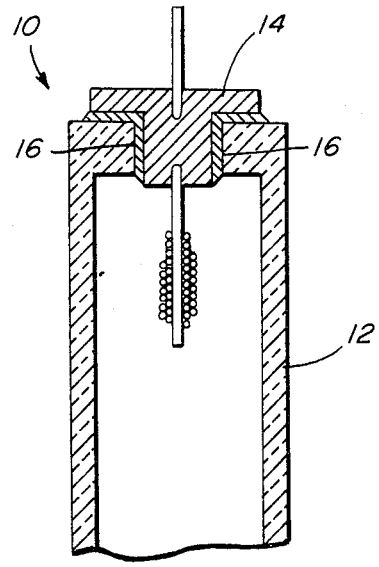
FIG. 1 is a sectional view of one end of a discharge tube of an electric lamp employing a feedthrough assembly which may be manufactured by the welding process disclosed herein.
Figure 2:
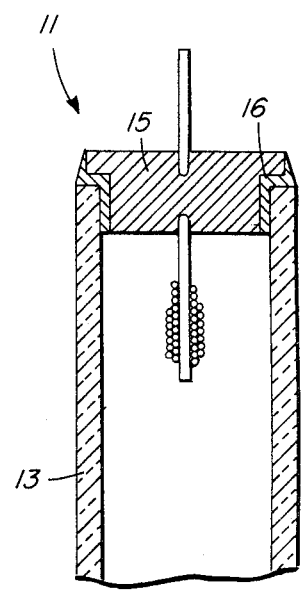
FIG. 2 is a sectional view of one end of an alternate design of a discharge tube for an electric lamp employing a feedthrough assembly which may be manufactured by the welding process disclosed herein.

FIG. 1 shows one end 10 of a vacuum-tight assembly, such as a discharge tube for an electric lamp, comprising body 12, electric feedthrough assembly 14, and sealing material 16. FIG. 2 shows one end 11 of an alternate embodiment of a discharge tube comprising straight ceramic arc tube 13, feedthrough 15, and sealing material 16.

Figure 3:
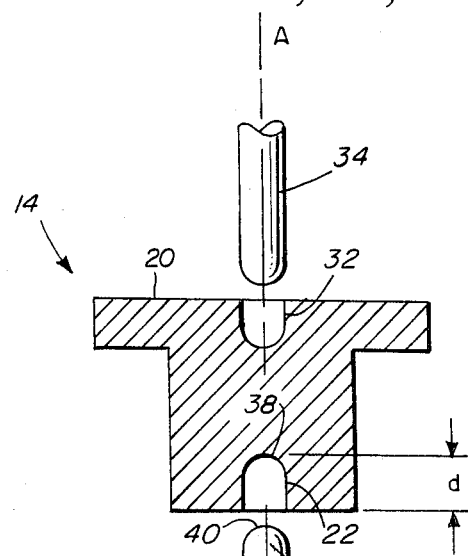
FIG. 3 is an enlarged exploded sectional view of an electric feedthrough assembly shown in either FIG. 1 or FIG. 2, with the electrode and lead-in pin shown in pictorial form.

FIG. 3 shows an enlarged exploded view of feedthrough 14 having a longitudinal axis A—A. Feedthrough 14 comprises plug 20 having cavity 22 formed therein for receiving wire pin 24. Plug 20 and wire pin 24 are formed from electrically conductive refractory materials; for example, plug 20 may be formed from a molybdenum-titanium-nickel alloy and wire pin 24 may be formed from tungsten. Wire pin 24 has coil 28 mounted proximate to end 30. Coil 28 may be impregnated with an electron-emissive coating, such as calcium barium tungstate; when so coated, coil 28 retains the emissive material and functions also as a radiator coil. Plug 20 may also have cavity 32 formed therein for receiving lead-in pin 34, as is shown in the drawing. Lead-in pin 34 may be another refractory material, such as molybdenum.

FIG. 3 shows feedthrough 14 before wire pin 24 has been welded into cavity 22 of plug 20. Lead-in pin 34 may be welded into cavity 32 of plug 20 by the same welding method.

Cavity 22 and end 36 must be shaped respectively so that intimate contact between the surface of end 36 and the surface within cavity 22 will be attained when appropriate force or pressure is applied. As used herein, intimate contact means that the atoms at the interface between the two surfaces are no further apart than the atoms within the materials. In this embodiment, cavity 22 comprises a cylindrical bore with an approximately hemispherical top 38. End 36 comprises a cylinder having a cross-sectional diameter slightly less than the diameter of the circular opening of cavity 22. End 36 also has a hemispherical top 40 so that end 36, when inserted into cavity 22 and appropriate pressure applied, will be in intimate contact with substantially all of the surface area within cavity 22, although this is not required. It is sufficient in this embodiment of the invention that intimate contact be attained between the cylindrical or lateral surfaces of end 36 and cavity 22. The insertion depth of end 36 within cavity 22 is shown in the drawing as distance d. In other embodiments, top 40 may be flat, conical, or other shape; in such embodiments it is desirable that top 38 be shaped to conform with the shape of top 40.

In electric current welding, the materials to be welded, which possess electrical resistance, are heated to a semi-fused or fused state by the passage of a heavy electrical pulse through them; the applied pressure assures intimate contact of the pieces to be fused and may be beneficial is assisting in the formation of the welded bond. When end 36 has been inserted in cavity 22 and intimate contact attained, the electrical resistance of the solid-to-solid interface is greater than that of either plug 20 or wire pin 24 due to surface roughness, so that application of an appropriate electrical pulse causes melting to occur only in the immediate vicinity of the interface. Extensive melting of feedthrough and electrode followed by subsequent recrystallization of the welded region, which is characteristic of TIG and laser welding, does not occur.

A metal coating may be applied to end 36 before welding. This coating should be applied on end 36 for approximately the length of the insertion depth. The coating should contain at least one of the metals found in the composition of plug 20, such as nickel, cobalt, or copper. Favorable results have been obtained with coatings having a thickness of approximately 50–200 nanometers. The coating may alternatively be applied to the surface of plug 20 within cavity 22. Likewise, a separate coating may be applied to lead-in pin 34 or the inside surface of cavity 32 prior to welding lead-in wire pin 34 to plug 20. The coating may be applied by various known techniques. A convenient technique is to apply a coating from a suspension of the metal in an alcohol having a suitable binder; the alcohol and binder may be baked out before welding leaving the desired coating.

Figure 4:
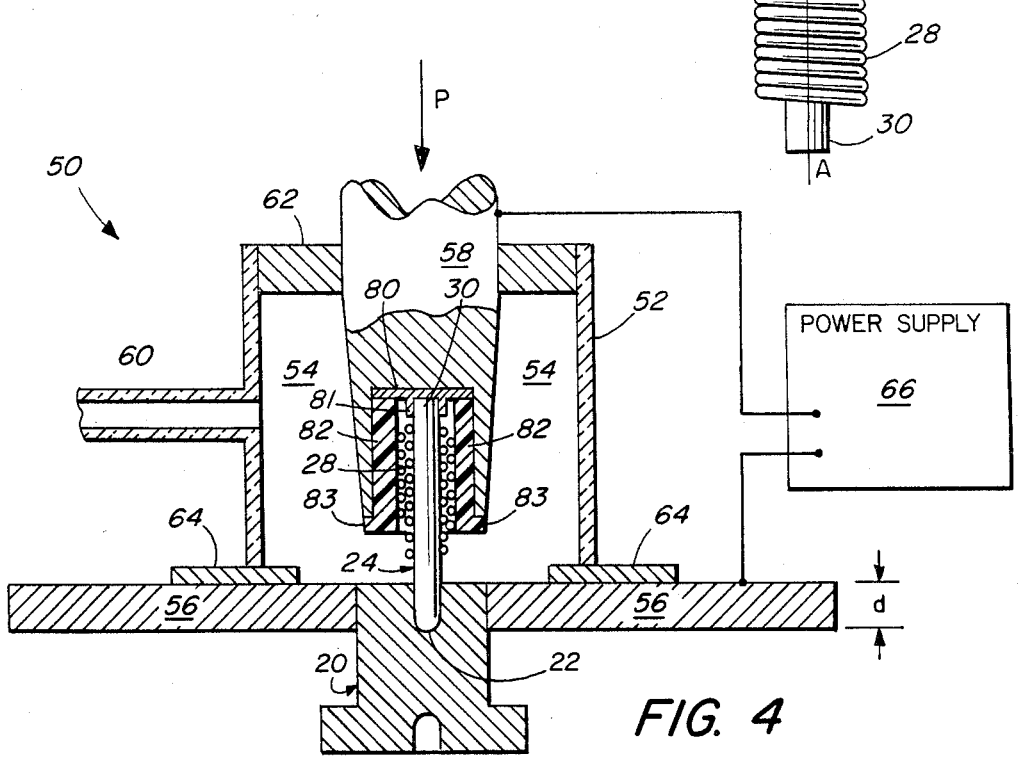
FIG. 4 is a sectional view of an embodiment of a welding apparatus.

FIG. 4 shows apparatus 50 for electric current welding of feedthrough 14. Outer wall 52, e.g., a quartz cylinder, partially encloses gas chamber 54. First electrode 56 has means for mounting plug 20 such that cavity 22 is exposed to gas chamber 54. As may be seen in the drawing, first electrode 56 forms one wall of gas chamber 54 in this embodiment. Second electrode 58 protrudes into chamber 54 and contacts end 30 of wire pin 24. Tube 60 is connected to means for purging gas chamber 54 of its ambient atmosphere and also to means for filling gas chamber 54 with a flowing inert gas atmosphere, such as dry argon gas. Top seal 62 and bottom seal 64, which may be a rubber plug and a gasket, close the regions of gas chamber 54 adjacent to first electrode 56 and second electrode 58, respectively. The two electrical terminals of welding power supply 66 are connected to first electrode 56 and second electrode 58, respectively.

Figure 5:
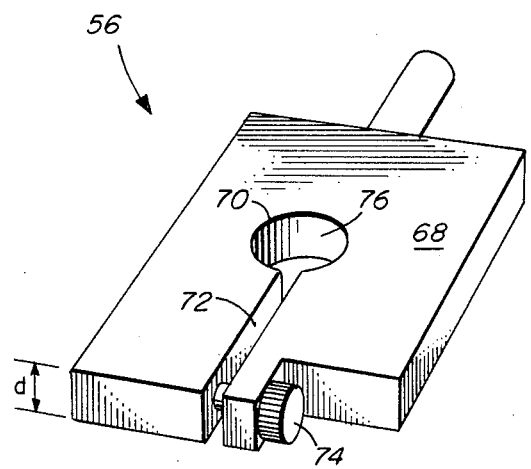
FIG. 5 is a pictorial view of the first electrode of the embodiment of the invention shown in FIG. 4.

FIG. 5 is a pictorial view of first electrode 56 employed in this embodiment. Electrically conductive plate 68 having cylindrical hole 70 therein with slot 72 extending radially from hole 70 to the extremity of plate 68 where set screw 74 comprises variable means for constricting the width of slot 72. Circular hole 70 has a diameter slightly greater than the cross-sectional diameter of plug 20. When plug 20 is inserted into hole 70 and set screw 74 tightened, plug 20 is securely mounted and lateral surface 76 of hole 70 makes electrical contact with plug 20. Thickness d of plate 68 is approximately equal to insertion depth d which is shown in FIGS. 3 and 4.

Referring to FIG. 4, second electrode 58 is shaped to cradle wire pin 24 having radiator coil 28 already mounted thereon. In other embodiments of the invention, second electrode 58 may be shaped to cradle wire pin 24 without coil 28 mounted thereon. In the latter embodiments, coil 28 is crimped onto wire pin 24 after the welding process has been completed. Radiator coil 28 has an electron-emissive coating on it which is not shown in the drawing. It is important that the coating not be destroyed, contaminated, or evaporated during the welding process in embodiments of the invention where radiator coil 28 is mounted on wire pin 24 prior to the weld.

Apparatus 50 has means for exerting an appropriate force or pressure on wire pin 24 in the direction of arrow P whereby intimate contact between wire pin 24 and the lateral surface of plug 20 within cavity 22 may be attained. A preferred material for electrodes 56 and 58 is copper because of its low electrical resistance and high heat-sinking ability. Copper may be malleable under welding conditions, and second electrode 58 might be deformed by end 30 when pressure is exerted against wire pin 24. Tungsten endplate 80 and cylindrical guide 81 may be employed to protect second electrode 58 from such deformation, to provide means for centering wire pin 24, and to prevent contamination of end 30; these functions may be accomplished without degrading the electrical contact between second electrode 58 and wire pin 24. Teflon insert 82 may be employed to provide electrical and thermal insulation for radiator coil 28 from second electrode 58. In this embodiment, insert 82 is a teflon cylinder with rim 83; the cylinder is sized to fit snugly about radiator coil 28. If wire pin 24 does not have coil 28 mounted on it during the welding process, second electrode 58 may be shaped with a narrow cylindrical hole to accept wire pin 24.

Gas chamber 54 need not be hermetically sealed. In this embodiment of the invention, slot 72 of first electrode 56 provides an outlet for the flowing inert gas atmosphere within gas chamber 54. A continuous flow of seven to twenty-five liters per minute of argon has experimentally been determined to provide clean welds. A flow of inert gas is preferred to a stagnant environment in order to maintain the pressure within the chamber slightly higher than that of the ambient atmosphere and also to flush away free oxygen or other contaminants released by the materials themselves during the welding process.

Figure 6:
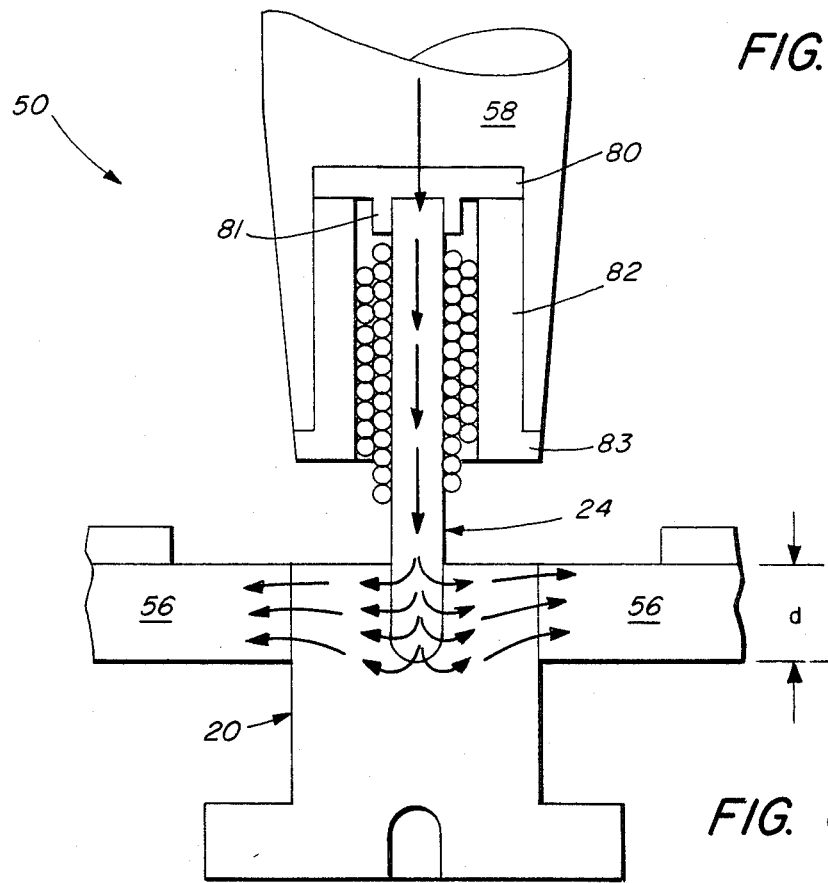
FIG. 6 is a pictorial view showing the radial current flow through the feedthrough assembly during the welding process for the apparatus shown in FIG. 4, with parts removed for clarity.

FIG. 6 contains a pictorial view of the current flow (in one polarity direction) during the welding process for apparatus 50 with parts removed for clarity. The current, shown by arrows in the drawing, passes through second electrode 58 and wire pin 24. The current emanates from wire pin 24 and into the body of plug 20 in directions which are substantially radial within cross sections of body 20. The current proceeds through body 20 into first electrode 56. The substantially radial flow of the current within plug 20 results from the requirement that the portion of first electrode 56 making electrical contact with plug 20 has a thickness d which is approximately equal to the insertion depth of wire pin 24. Plug 20 should be mounted in electrode 56 such that the inserted portion of wire pin 20 is positioned between the planes of the top and bottom surfaces of electrode 56 in order to achieve the described radial current flow. The fact that the current flows within plug 20 through only a limited portion of plug 20 provides substantial protection for the remaining portion of plug 20 against extensive heating during the welding process. When the polarity of the current is reversed, the current flows along the same lines shown in FIG. 6 except the directions are reversed.

Figure 7:
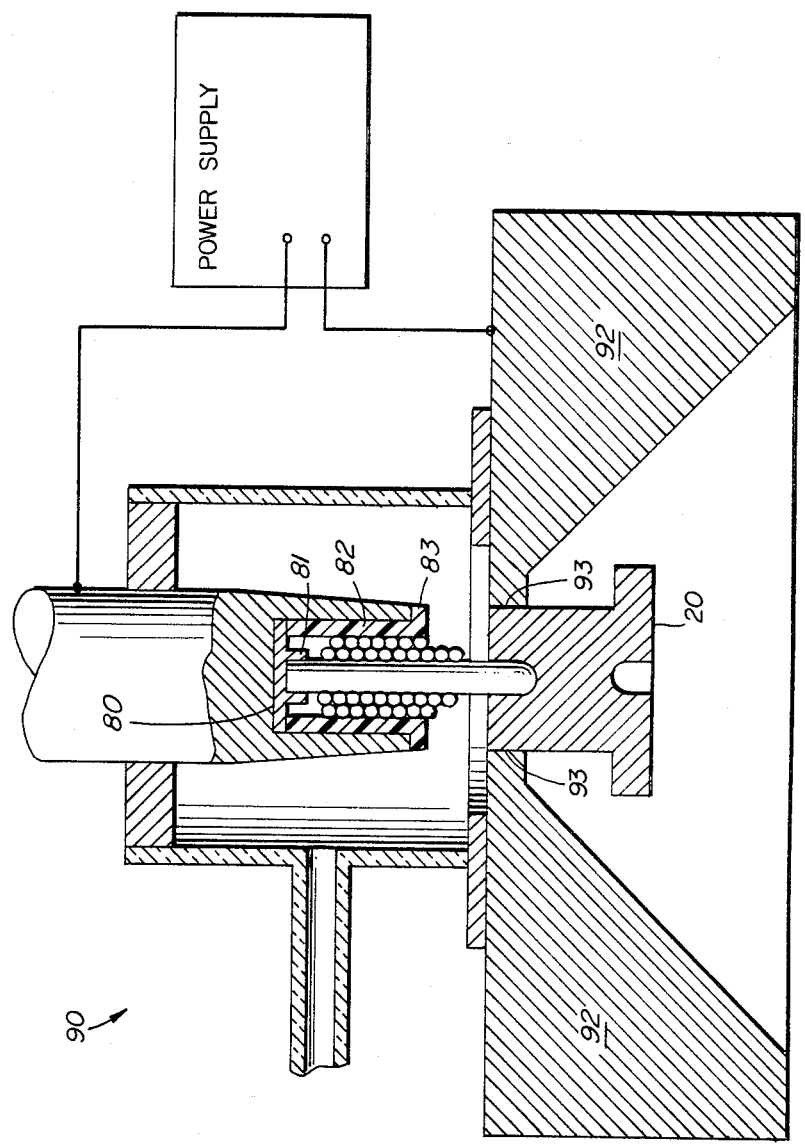
FIG. 7 is a sectional view of the embodiment of the invention shown in FIG. 4, except that the first electrode is more massive and shaped.

As has been mentioned, copper is a preferred material for both electrodes 56 and 58 because of its high electrical and thermal conductivity. First electrode 56 may be much more massive than shown in FIGS. 4, 5, and 6, except that the surface area of first electrode 56 where electrical contact is made with plug 20 should not change so that the current flow will not be substantially altered. The more massive electrode will have greater heat-sinking ability which further protects plug 20 from extensive heating. FIG. 7 show apparatus 90 which is essentially the same embodiment of the invention as apparatus 50 except that first electrode 92 is more massive than first electrode 56; electrode 92 is shaped such that surface area 93, which makes electrical contact with plug 20, remains constant with that of first electrode 56 of FIGS. 4 and 6. For similar reasons, second electrode 58 also should be reasonably massive.

The apparatus described herein is effective in localizing the current flow through wire pin 24 and plug 20 and in drawing substantial heat from the feedthrough during and after the weld. Experimentation has shown that the electron-emissive coating on coil 28 will not be destroyed, contaminated, or evaporated. Thus, the feedthrough may be welded with the coil already mounted, which is an advantage in manufacturing.

In the embodiment of the invention shown in FIGS. 4 6, and 7, welding supply 66 is a Hughes Aircraft Welder, Model HRW-1000. The weld is made by applying an electrical current pulse of 500 watt-seconds with a voltage of 650 volts.

Feedthrough assemblies welded as described herein produce clean welds. The structure of the feedthrough plug after welding is substantially unchanged, and the plugs do not crack or otherwise deteriorate when subjected to thermal cycling conditions of 25° C. to 800° C. over short periods of time, e.g., approximately ten minutes, as is the case in the operational environment during lamp turn-on and turn-off. The radiator coil, if mounted during welding, is not damaged by the weld.

Molybdenum-titanium-nickel plugs welded as described herein were prepared for 400 watt high-pressure sodium lamps. The feedthrough assemblies were sealed into both ends of alumina arc tubes, and the lamps were operated. The lamps exhibited normal operating behavior.

While there have been shown and described what are at present considered to be the preferred embodiments of the invention, it will be apparent to those skilled in the art that various changes and modifications can be made herein without departing from the scope of the invention as defined by the appended claims.

We claim:

1. A method of welding an electric feedthrough assembly for an electric lamp, said assembly comprising a plug and a wire pin, said plug and said wire pin each being formed from an electrically conductive refractory material, said plug having a body with a cavity formed therein for receiving said wire pin, said body being bounded by a plurality of surfaces, said wire pin having first and second ends, said method comprising the steps of:
    (a) inserting said first end of said wire pin into said cavity so that a joint is formed;
    (b) surrounding said joint with a flowing insert gas atmosphere;
    (c) applying force such that said wire pin makes intimate contact with a first surface of said plug within said cavity; and
    (d) applying a pulse of electrical current through said wire pin and said plug such that a permanent bond is formed between said wire pin and said first surface of said plug within said cavity.

2. A method as described in claim 1 further comprising the step of engaging a shaped electrode with a portion of a second surface of said plug prior to Step (d) so that the electrical current caused by the application of said pulse is directed by said electrode to flow primarily through a limited portion of said body of said plug.

3. A method as described in claim 2 wherein said plug is formed from an alloy having a composition which comprises molybdenum, titanium, and a material selected from the group consisting of nickel, cobalt, copper, and mixtures thereof; and said wire pin comprises a material selected from the group consisting of tungsten and molybdenum.

4. A method as described in claim 3 further comprising the step of applying a metal coating on said first end of said wire pin prior to Step (a), said metal coating comprising at least one of the metals of said composition of said plug.

5. A method as described in claim 3 further comprising the step of applying a metal coating on a surface of said plug within said cavity prior to Step (a), said metal coating comprising at least one of the metals of said composition of said plug.

6. An apparatus for electric-current welding of an electric feedthrough assembly for an electric lamp, said assembly comprising a plug and a wire pin, said plug and said wire pin each being formed from an electrically conductive refractory material, said plug having a body with a cavity formed therein for receiving said wire pin, said body being bounded by a plurality of surfaces, said appartus comprising:
    (a) an outer wall partially enclosing a gas chamber;
    (b) means for mounting said plug such that said cavity is exposed to said gas chamber:
    (c) a first electrode protruding into said gas chamber, said first electrode naking contact with said plug;
    (d) a second electrode protruding into said gas chamber, said second electrode making contact with said wire pin;
    (e) means for substantially closing said gas chamber;
    (f) means for purging said gas chamber of the ambient atmosphere and means for filling said gas chamber with a flowing inert gas atmosphere;
    (g) means for applying force such that intimate contact between said wire pin and a first surface of said plug within said cavity is attained. said wire pin having an insertion depth in said cavity when said intimate contact has been attained; and
    (h) means for applying an electrical pulse through said first and second electrodes, said wire pin, and said plug such that a permanent bond is formed between said wire pin and said first surface of said plug within said cavity.

7. An apparatus as described in claim 6 wherein said first electrode is shaped to make contact with a portion of a second surface of said plug so that the electrical current caused by said pulse is directed by said first electrode to flow primarily through a limited portion of said body of said plug.

8. An apparatus as described in claim 7 wherein said first electrode comprises an electrically conductive plate having top, bottom, and side surfaces, said plate having a cylindrical hole therein running from said top surface to said bottom surface, said hole having a longitudinal axis approximately equal to said insertion depth of said wire pin in said cavity, said plate having a slot extending from said hole to a side surface of said plate with means mounted on said plate for variably constricting the width of said slot, said plug comprising a cylinder having a cross-sectional diameter slightly less than the cross-sectional diameter of said hole; so that when said plug with said wire pin inserted in said cavity is electrically engaged with a surface of said first electrode within said hole, and the inserted portion of said wire pin is positioned between the planes of the top and bottom surfaces of said plate, the electrical current caused by said pulse will flow within said body of said plug primarily between the planes of the top and bottom surfaces of said plate.

9. An apparatus as described in claim 8 wherein said wire pin has a first end inserted into said cavity and an electrically conductive object mounted on said wire pin proximate to the second end thereof, and said second electrode is adapted to make electrical contact with said second end of said wire pin without making electrical contact with said object; so that the electrical current flowing through said wire pin and said object as a result of said pulse is directed by said second electrode to flow primarily through said wire pin.

* * * * *